US009811678B2

(12) United States Patent
Tanik et al.

(10) Patent No.: US 9,811,678 B2
(45) Date of Patent: Nov. 7, 2017

(54) METHOD AND SYSTEM FOR TRANSFERRING DATA AND INSTRUCTIONS THROUGH A HOST FILE SYSTEM

(71) Applicant: SanDisk Technologies Inc., Plano, TX (US)

(72) Inventors: Haluk Kent Tanik, Batman (TR); Robert Chin-Tse Chang, Danville, CA (US); Po Yuan, Milpitas, CA (US); Bahman Qawami, San Jose, CA (US); Farshid Sabet-Sharghi, Los Altos Hills, CA (US)

(73) Assignee: SanDisk Technologies LLC, Plano, TX (US)

( * ) Notice: Subject to any disclaimer, the term of this patent is extended or adjusted under 35 U.S.C. 154(b) by 254 days.

(21) Appl. No.: 14/459,964

(22) Filed: Aug. 14, 2014

(65) Prior Publication Data

US 2014/0359285 A1 Dec. 4, 2014

Related U.S. Application Data

(62) Division of application No. 11/967,622, filed on Dec. 31, 2007, now abandoned.

(51) Int. Cl.
*G06F 21/62* (2013.01)
*G06F 21/79* (2013.01)

(52) U.S. Cl.
CPC .......... *G06F 21/6218* (2013.01); *G06F 21/79* (2013.01)

(58) Field of Classification Search
CPC .......... G06F 21/62; G06F 21/79; G06F 21/57
See application file for complete search history.

(56) References Cited

U.S. PATENT DOCUMENTS

| 6,141,681 | A  | 10/2000 | Kyle |
| 6,418,486 | B1 | 7/2002  | Lortz et al. |
| 6,434,535 | B1 | 8/2002  | Kupka et al. |
| 6,581,094 | B1 | 6/2003  | Gao |
| 7,036,020 | B2 | 4/2006  | Thibadeau |
| 7,110,982 | B2 | 9/2006  | Feldman et al. |
| 7,215,771 | B1 | 5/2007  | Hamlin |

(Continued)

FOREIGN PATENT DOCUMENTS

WO WO 2009/070430 A2 6/2009

*Primary Examiner* — Brandon Hoffman
*Assistant Examiner* — Wasika Nipa
(74) *Attorney, Agent, or Firm* — Brinks Gilson & Lione

(57) ABSTRACT

A method for encrypting data may generate an encryption instruction and combine it with a payload of data to form a packet. The packet is associated with a command and passed to a host file system process. The packet, now associated with a second command, is received from the host file system process. The encryption instruction and the payload of data are extracted from the packet. At least a portion of the payload of data is encrypted based on the encryption instruction. A method for decrypting data may receive a packet and generate a decryption instruction. At least a portion of the packet is decrypted using at least the decryption instruction. The second packet comprising the decrypted packet is passed to a host file system process. A third packet comprising the decrypted packet is received from the host file system process. The decrypted packet is extracted from the third packet.

23 Claims, 10 Drawing Sheets

(56) References Cited

U.S. PATENT DOCUMENTS

| | | |
|---|---|---|
| 7,426,747 B2 | 9/2008 | Thibadeau |
| 7,493,656 B2 | 2/2009 | Goodwill et al. |
| 7,661,000 B2 | 2/2010 | Ueda et al. |
| 2003/0115147 A1 | 6/2003 | Feldman et al. |
| 2004/0015574 A1 | 1/2004 | Meyerson |
| 2004/0025040 A1* | 2/2004 | Aoki .................. G06F 21/72 713/193 |
| 2004/0172538 A1* | 9/2004 | Satoh ................. G06F 21/80 713/175 |
| 2006/0242068 A1 | 10/2006 | Jogand-Coulomb et al. |
| 2007/0043667 A1 | 2/2007 | Qawami et al. |
| 2007/0136509 A1 | 6/2007 | Agami |
| 2007/0218945 A1 | 9/2007 | Agami et al. |
| 2007/0259691 A1 | 11/2007 | Santos Garcia |
| 2009/0172393 A1 | 7/2009 | Tanik et al. |

\* cited by examiner

METHOD AND SYSTEM FOR TRANSFERRING DATA AND INSTRUCTIONS THROUGH A HOST FILE SYSTEM

This application is a divisional application of, and claims priority to, U.S. Non-Provisional patent application Ser. No. 11/967,622, "Method And System For Transferring Data And Instructions Through A Host File System" filed Dec. 31, 2007, the entire contents of which are incorporated by reference.

TECHNICAL FIELD

This application relates generally to the operation of non-volatile flash memory systems, and, more specifically, to a method and system for transferring data and instructions through a host file system.

BACKGROUND

There are many commercially successful non-volatile memory products being used today, particularly in the form of small form factor cards, which employ flash EEPROM (Electrically Erasable and Programmable Read Only Memory) cells formed on one or more integrated circuit devices. Some of the commercially available card formats include CompactFlash (CF) cards, MultiMedia cards (MMC), Secure Digital (SD) cards, personnel tags (P-Tag), and Memory Stick cards. Hosts include personal computers, notebook computers, personal digital assistants (PDAs), various data communication devices, digital cameras, cellular telephones, portable audio players, automobile sound systems, and similar types of equipment. In some systems, a removable card does not include a controller and the host controls operation of the memory in the card. Examples of this type of memory system include Smart Media cards and xD cards. Thus, control of the memory may be achieved by software on a controller in the card or by control software in the host. Besides a memory card implementation, this type of memory can alternatively be embedded into various types of host systems. In both removable and embedded applications, host data may be stored in the memory according to a storage scheme implemented by memory control software.

The memory control software may interface with a host file system, which, in turn, may interface with a memory file manager which provides an application programming interface (API) to applications accessing the memory. Host file systems may support a set of read and write commands to access storage systems connected to the host, may be optimized for the resource limitations or features of the host, and may include advanced features such as multi-thread support.

The feature set of a memory file manager communicating with the memory control software through a host file system may be limited by the command set, such as read and write commands, provided by the host file system interface. A host file system may be supplemented with an additional, specialized file system, which may implement all of the required features specific to accessing the memory. Implementing a specialized file system may require additional software code storage space, and a specialized file system may not leverage or implement all of the features of the host file system. Synchronization of file system information is also necessary when a host file system and specialized file system are operated in parallel with one another.

SUMMARY

In order to address these issues, there is a need for a way to pass instructions through a host file system from a memory file manager to memory control software. Additionally, there is a need to pass status information from the memory control software to the memory file manager.

Thus, according to one aspect of the invention, a method is provided for encrypting data. An encryption instruction is generated, where the encryption instruction indicates whether an encryption operation is to be executed. The encryption instruction is combined with a payload of data to form a packet. The packet is associated with a command to form a command set. The command set is passed to a host file system process. A second command set is received from the host file system process, where the second command set includes the packet associated with a second command. The packet is extracted from the second command set. The encryption instruction and the payload of data are extracted from the packet. At least the payload of data is encrypted based on the encryption instruction, where the encryption of at least the payload of data is independent of the host file system process.

In another aspect of the invention, there is a method for decrypting data. A packet is received. A decryption instruction is generated, where the decryption instruction indicates whether a decryption operation is to be executed. At least a portion of the packet is decrypted using at least the decryption instruction to form a decrypted packet. A second packet is formed comprising the decrypted packet. The second packet is passed to a host file system process. A third packet is received from the host file system process, where the third packet includes the decrypted packet. The decrypted packet is extracted from the third packet. The payload of data is extracted from the decrypted packet.

According to another aspect of the invention, there is a method of transferring data and encryption instructions through a host file system. A write command and a payload of data are received from a host program. An encryption instruction is formed based on a determination of whether the payload of data should be encrypted. A data verification field is determined using at least the payload of data. The encryption instruction, the data verification field, and the payload of data are combined to form a packet. A file system level write command is generated based on the write command. The packet is associated with the file system level write command to form a file system level write command set. The file system level write command set is passed to a host file system process. An address-level write command set is received from the host file system process, where the address-level write command set is derived from the file system level write command set and includes the packet associated with an address level command. The packet is extracted from the address-level write command set. The encryption instruction, the data verification field, and the payload of data are extracted from the packet. The payload of data is verified using at least the data verification field. At least the payload of data is encrypted based on the encryption instruction, where the encryption of at least the payload of data is independent of the host file system process. A device level write command is generated based on the address level command. At least the encrypted payload of data is associated with a device level write command to form a device level write command set.

In yet another aspect of the invention, there is a method of transferring data and decryption instructions through a host file system. A decryption instruction is formed based on determining whether the packet should be decrypted. At least a portion of the packet is decrypted using the decryption instruction, to form a decrypted packet. An address-level read result is formed, containing at least a portion of the decrypted packet. An address-level read result is passed to a host file system process. A file system level read result is received from the host file system process, where the file system level read result is derived from the address-level read result. The payload of data is extracted from the file system level read result.

Other methods and systems, and features and advantages thereof will be, or will become, apparent to one with skill in the art upon examination of the following figures and detailed description. It is intended that the scope of the invention will include the foregoing and all such additional methods and systems, and features and advantages thereof.

BRIEF DESCRIPTION OF THE DRAWINGS

The components in the figures are not necessarily to scale, emphasis instead being placed upon illustrating various aspects thereof. Moreover, in the figures, like referenced numerals designate corresponding parts throughout the different views.

DETAILED DESCRIPTION OF THE PRESENTLY PREFERRED EMBODIMENTS

Applications in an exemplary system may need to write data to a storage system, and read data from a storage system. Some of these write and read requests may involve writing and reading data according to Digital Rights Management (DRM) rules established by the application, the storage system, or both. These rules may require that some data stored in a storage system, such as a non-volatile memory card, must be in an encrypted format. The DRM rules may also require that the data transmitted between the exemplary system and the storage system is in an encrypted format. These rules may also specify regions of the storage system where data stored must be in an encrypted format. In one example, the regions may be defined by address ranges within a non-volatile memory. In order to adhere to these DRM rules, an exemplary system may support additional functionality, such as encryption of data before storage and decryption of data after retrieval from the storage system.

A system for encrypting data written to and decrypting data read from a storage system may appear in a variety of hosts, including personal computers, notebook computers, personal digital assistants (PDAs), various data communication devices, digital cameras, cellular telephones, portable audio players, automobile sound systems, and similar types of equipment.

Figure 1:
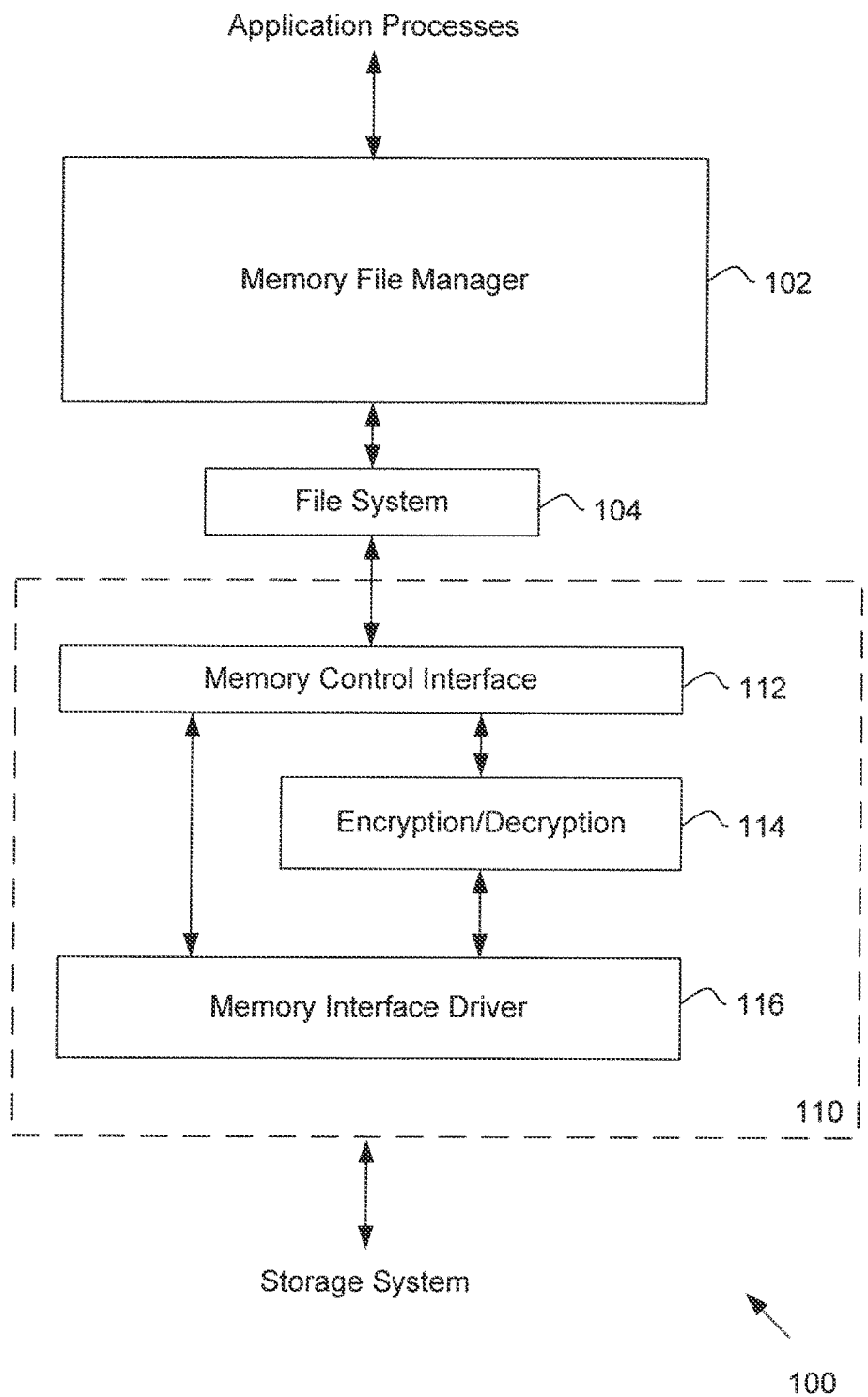
FIG. 1 is a diagram illustrating a system for encrypting and decrypting data using commands and data passed through a file system.

There are several architectures that may be utilized to implement a system for encrypting data written to, and decrypting data read from, a storage system such as a non-volatile memory. FIG. 1 is a diagram illustrating a system for encrypting and decrypting data using commands and data passed through a file system. A system 100 for encrypting and decrypting data written to and read from a storage system may be implemented in hardware, software, or firmware, or any combination of hardware, software or firmware. The exemplary system 100 may communicate with application processes that send requests to encrypt and store data, or send requests to retrieve and decrypt data. The application process may be within the same host as the system 100, or may be remote processes that send requests over a network or other suitable communication links. The system 100 may communicate with a storage system, such as a non-volatile memory, non-volatile memory card, volatile memory, disk drive, or any other local or remote storage device capable of storing data. If the storage system is remote, data to be stored and retrieved may be transmitted and received over a network or other suitable communication links.

The system 100 includes a memory file manager 102, file system 104, and a memory device interface 110. Each component of the system 100 may be implemented in hardware, software, or firmware, or any combination of hardware, software or firmware. For example, the file system 104 may be implemented as a combination of hardware, software, or firmware, or any combination of hardware, software or firmware. Thus, the file system 104 may also be referred to as a file system process. The memory device interface 110 includes a memory control interface 112, an encryption/decryption engine 114, and a memory interface driver 116. The memory file manager may receive requests from application processes to write data to and read data from a storage system such as a non-volatile memory in communication with a memory interface driver 116. Some of the requests from application processes may require that the encryption/decryption engine 114 encrypt data before it is written to a storage system by the memory interface driver 116, or decrypt data after it is read from a storage system by the memory interface driver 116.

The Digital Rights Management (DRM) rules may be different for each write and read request, so the memory file manager 102 may be required to dynamically configure the encryption/decryption engine 114 for each write and read request or may be required to receive status results from the encryption/decryption engine 114. The configuration of encryption/decryption engine 114 may require instructions and control parameters such as keys or key index values.

One such configuration may also include not encrypting a file before storage, or not decrypting that was stored in an unencrypted format. Further, some write and read requests to a storage system may be for the purpose of configuring or reading status from the storage system itself. For example, a system may need to write to a storage system to update the File Allocation Table (FAT), or read the file allocation table from memory. In these instances, the data written to the storage system may not be encrypted before storage. Therefore, there is a need to be able to control the encryption/decryption engine 114 for each access to the storage system.

In the exemplary system 100, the file system 104 provides a communication link between the memory file manager 102 and the memory device interface 110. However, the communication link provided by a file system 104 may not be capable of passing commands suitable for configuring the encryption/decryption engine 114.

One way of evaluating the capabilities of the communication link of a file system 104 is to evaluate the Application Programming Interface (API) provided by the file system. A file system may provide an API that programs may use to access a storage system such as a non-volatile memory, volatile memory, disk drive, or any other local or remote storage device capable of storing data. Specifically, the API of a file system is evaluated in order to determine if encryption/decryption instructions and status can be passed as separate parameters within one or more functions of the file system API.

One example of a file system API is the Win32 File I/O API, provided by Microsoft Corporation. The Win32 API supports read and write functions for reading and writing a file on a storage system, with the following function prototypes:

BOOL ReadFile(HANDLE hFile, LPVOID lpBuffer, DWORD nNumberOfBytesToRead, LPDWORD lpNumberOfBytesRead, LPOVERLAPPED lpOverlapped);

BOOL WriteFile(HANDLE hFile, LPCVOID lpBuffer, DWORD nNumberOfBytesToWrite, LPDWORD lpNumberOfBytesWritten, LPOVERLAPPED lpOverlapped);

The ReadFile function parameters hFile, lpBuffer, nNumberOfBytesToRead, and lpOverlapped specify the file to read, the buffer to copy the file data to, the number of bytes to read, and the I/O mode to use, respectively. The ReadFile function may return a boolean success flag, and parameter lpNumberOfBytesRead that indicates the number of bytes actually read. Similarly, the WriteFile function parameters hFile, lpBuffer, nNumberOfBytesToWrite, and lpOverlapped specify the file to write, the buffer to copy the file data from, the number of bytes to write, and the I/O mode to use, respectively. The WriteFile function may return a boolean success flag, and parameter lpNumberOfBytesWritten that indicates the number of bytes actually written.

When the WriteFile or ReadFile function is called, the Windows file system may translate the function call into low-level read and write function calls, such as read and write accesses to a logical block address or address range of a storage device. The file system may then make calls to functions in the memory control software of a storage system device driver in order to complete the request.

However, inspection of the Win32 API WriteFile and ReadFile function prototypes shows that the functions do not support the passing of encryption/decryption instructions and status as separate parameters to the function. In systems 100 where the file system 104 provides a means of passing encryption/decryption instructions and status between the memory file manager 102 and the memory device interface 110, there may be a method of utilizing a file system with an API capable of passing encryption/decryption instructions as separate function parameters, and returning encryption/decryption results or status as separate function parameters. This file system may be operated in parallel with other host file systems, such as the Win32 File I/O file system, that may service storage requests or other storage systems that do not require encryption or decryption.

Using the foregoing method for passing encryption/decryption instructions and status between the memory file manager 102 and the memory device interface 110, a system 100 may process application requests to encrypt and write data to a storage system, and read and decrypt data from a storage system.

In one example, the memory file manager 102 may receive an application request to store a file on a storage system in communication with the memory interface driver 116. The application request may also contain an instruction to encrypt the file before storage, or the memory file manager 102 may determine that the file should be encrypted. The memory file manager may call a function supported by the API of the file system 104 to encrypt and store the file. The parameters passed to the function of file system 104 may include the file to encrypt and store, and an encryption instruction. The file system 104 may perform file-level to logical block address (LBA) conversion, where a file is assigned to a plurality of available logical block addresses in the non-volatile memory, and may, in response to receiving a command from the memory file manager 102, generate a plurality of logical block address commands to transmit to the memory control interface 112. The commands may include encryption instructions. The commands may be passed as function calls to the API of the memory control interface 112, where an encryption instruction may be passed as a separate parameter of the function. The LBA-level commands, encryption instructions, and associated data are received by the memory control interface 112. If the command is an encrypted write command, the memory control interface 112 may pass the data and an encryption instruction to the encryption/decryption engine 114 for encryption. The encrypted data is then written to the storage system by the memory interface driver 116.

In another example, the memory file manager 102 may receive an application request to read a file on a storage system in communication with the memory interface driver 116. The application request may also contain an instruction to decrypt the file after reading it from the storage system, or the memory file manager 102 may determine that the file should be decrypted before it is returned to the application. The memory file manager may call a function supported by the API of the file system 104 to decrypt and store the file. The parameters passed to the function of file system 104 may include the file to read and decrypt, and a decryption instruction. The file system 104 may perform file-level to logical block address (LBA) conversion, where the stored location of a file is expressed as a plurality of logical block addresses or address ranges. The commands may include decryption instructions. The commands may be passed as function calls to the API of the memory control interface 112, where a decryption instruction may be passed as a separate parameter of the function. The LBA-level commands, decryption instructions, and associated data are received by the memory control interface 112. If the command is a decrypted read command, the memory control interface 112 may command the memory interface driver 116 to read data from the non-volatile memory, and the memory control interface 112 may direct the encryption/decryption engine 114 to decrypt the data returned from the non-volatile memory to the memory interface driver 116. The memory control interface 112 may receive the decrypted data from the encryption/decryption engine 114, and may pass the decrypted data to the file system 104, which then passes the data (such as complete files read from a non-volatile memory) to the memory file manager 102. Status reported from the encryption/decryption engine 114 may be returned to the memory file manager 102 in the same way, as a separate parameter that is passed through the file system 104.

Therefore, in order to pass information necessary to complete the encryption/decryption operation, such as keys, key indexes, or other configuration parameters, from the memory file manager 102 to the memory control interface 112, the aforementioned method may utilize a file system, or modify or create a file system, with an API capable of passing this information as separate parameters. Using the method, a file system with an API that does not support passing encryption/decryption instructions and status as separate parameters, such as the Win32 File I/O system, may be unsuitable for implementing a file system 104 in the system 100.

Figure 2:
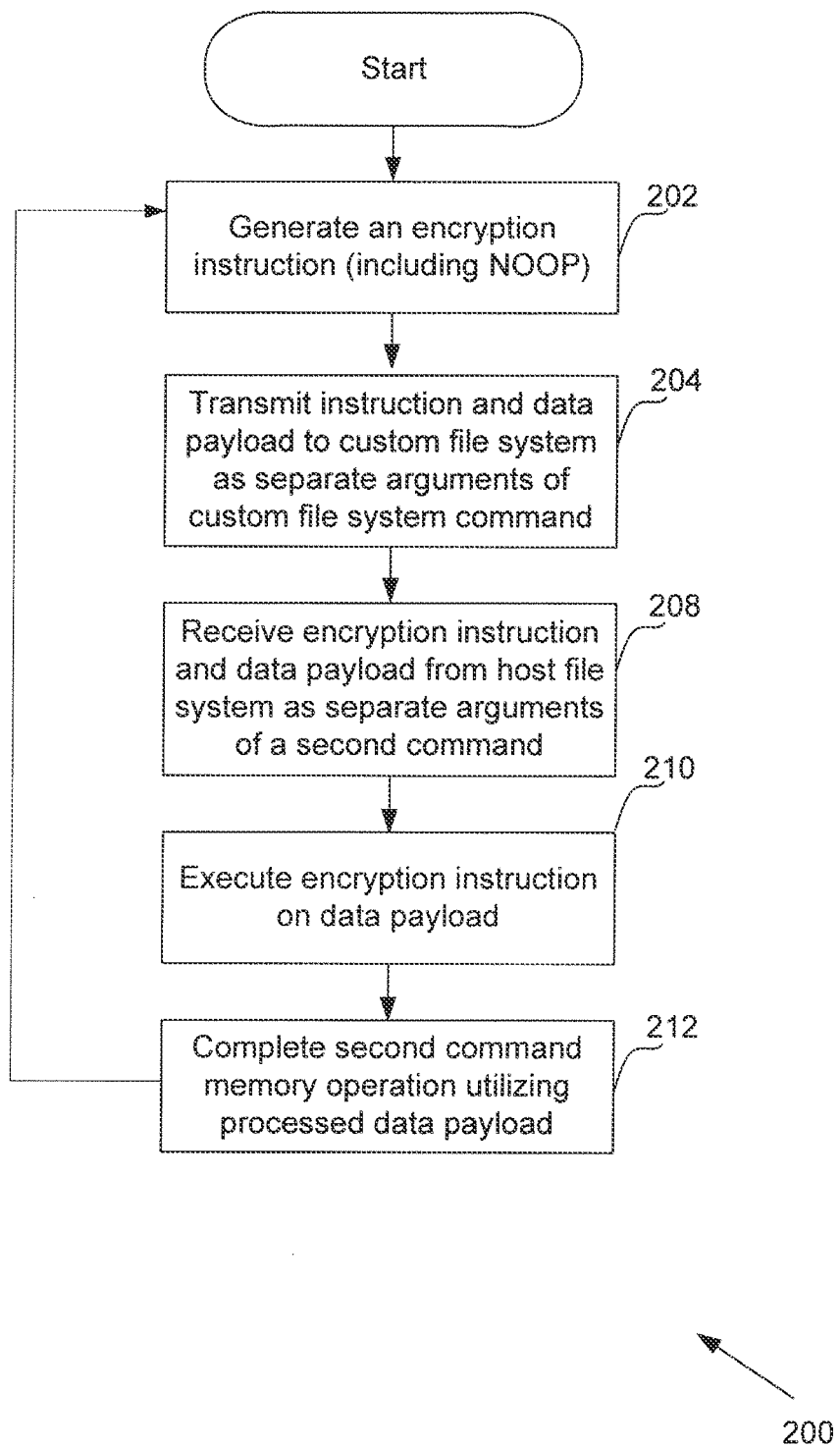
FIG. 2 shows exemplary steps for encrypting data using commands and data passed through a file system as separate parameters.

FIG. 2 shows exemplary steps 200 for encrypting data using commands and data passed through a file system as separate parameters. The exemplary steps may be utilized by a system 100 in FIG. 1, if the file system 104 utilizes the method of passing an encryption instruction as a separate parameter from the memory file manager 102 to the memory control interface 112. At step 202, an encryption instruction is generated. Referring briefly back to FIG. 1, the memory file manager 102 may receive a request from an application to encrypt and write a file to non-volatile memory. The request may include other parameters, such as digital rights management (DRM) information specified by the application, which may, for example, define the encryption key and encryption algorithm that the encryption/decryption engine 114 will use. In another example, the memory file manager may also receive a request from an application to write a file to non-volatile memory without any encryption, in which case the encryption instruction formed will be a no-operation (NOOP), and the encryption/decryption engine 114 will simply pass through the data from the memory control interface 112 to the memory interface driver 116.

Returning back to FIG. 2, at step 204, the memory file manager passes an instruction such as an "encrypted write" instruction, which may include encryption parameters, and the file to be encrypted and stored, to the file system. The file system supports encryption and decryption instructions not usually supported by an exemplary host file system. The file system may receive an instruction and associated file in step 204, and may perform file-level to logical block address (LBA) conversion, where a file is assigned to a plurality of available logical block addresses. In response to receiving the exemplary "encrypted write" command, the file system may also generate a plurality of logical block address encrypted write instructions, where an instruction is associated with a data payload that is at least a portion of the file data to be written. Control passes to step 208, where the plurality of logical block address encrypted write instruction and data payload pairs are received. In step 210, for each received pair, the data payload is encrypted (or passed through) according to the received logical block address encrypted write instruction. Control then passes to step 212, where the processed data payload is written to the non-volatile memory according to the logical block address encrypted write instruction.

Figure 3:
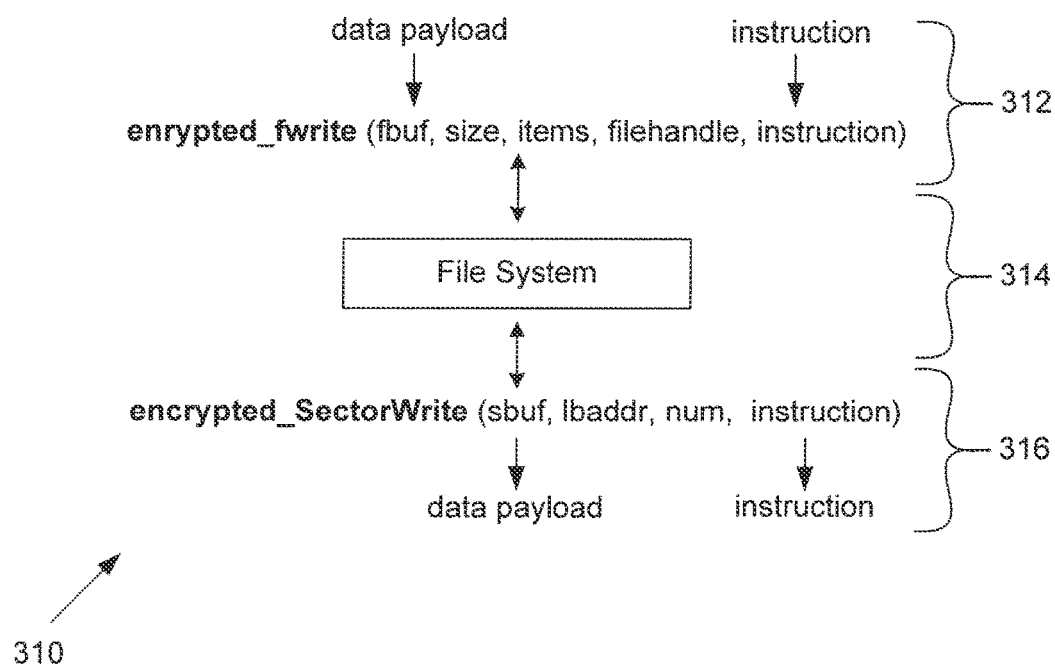
FIG. 3 is a diagram illustrating a system for passing data payload, data tags, and encryption instructions through a file system as separate parameters.

FIG. 3 is a diagram illustrating a system for passing data payload, data tags, and encryption instruction through a file system as separate parameters. A system 310 is a portion of a system for encrypting and decrypting data written to and read from a storage system, such as the system 100 of FIG. 1. Specifically, the file system 314 of the system 310 may be utilized as the file system 104 of system 100 in FIG. 1, where the file system 104 utilizes the method of passing encryption/decryption instructions and status as separate parameters from the memory file manager 102 to the memory control interface 112.

The system 310 utilizing a file system 314 may support an encrypted file write function 312 to encrypt and write a file to a storage system. The function prototype of the encrypted file write function 312 includes separate fbuf and instruction parameters, to accommodate passing a data payload and encryption instruction to the memory control software of a storage system device driver. The size of the data payload may be indicated by the product of the items parameter, which may indicate the number of items to transfer, and the size parameter, which may indicate the size of an item in bytes. The filehandle parameter indicates the file to which data is being written to. Typically, the fbuf parameter accepts the file data to write, or a pointer to the file data to write. An application may call the encrypted file write function 312 of the file system 314 to encrypt and write a file to a storage system. The file system 314 will process the request, and may translate the file-level write request into a plurality of function calls to an encrypted sector write function 316 supported by the memory control software of a storage system device driver. The function prototype of the encrypted sector write function 316 includes separate instruction and sbuf parameters, to accommodate passing the encryption instruction and at least a portion of the data payload to the memory control software of a storage system device driver. The num parameter may indicate the number of bytes to write, and the lbaddr parameter indicates the logical block address where the first byte may be written to. Typically, the sbuf parameter accepts the sector data to write, or a pointer to the sector data to write. In system 310, in order to pass an encryption instruction through the file system, the API of the file system 314 accepts the encryption instruction as a parameter of one or more functions.

Figure 4:
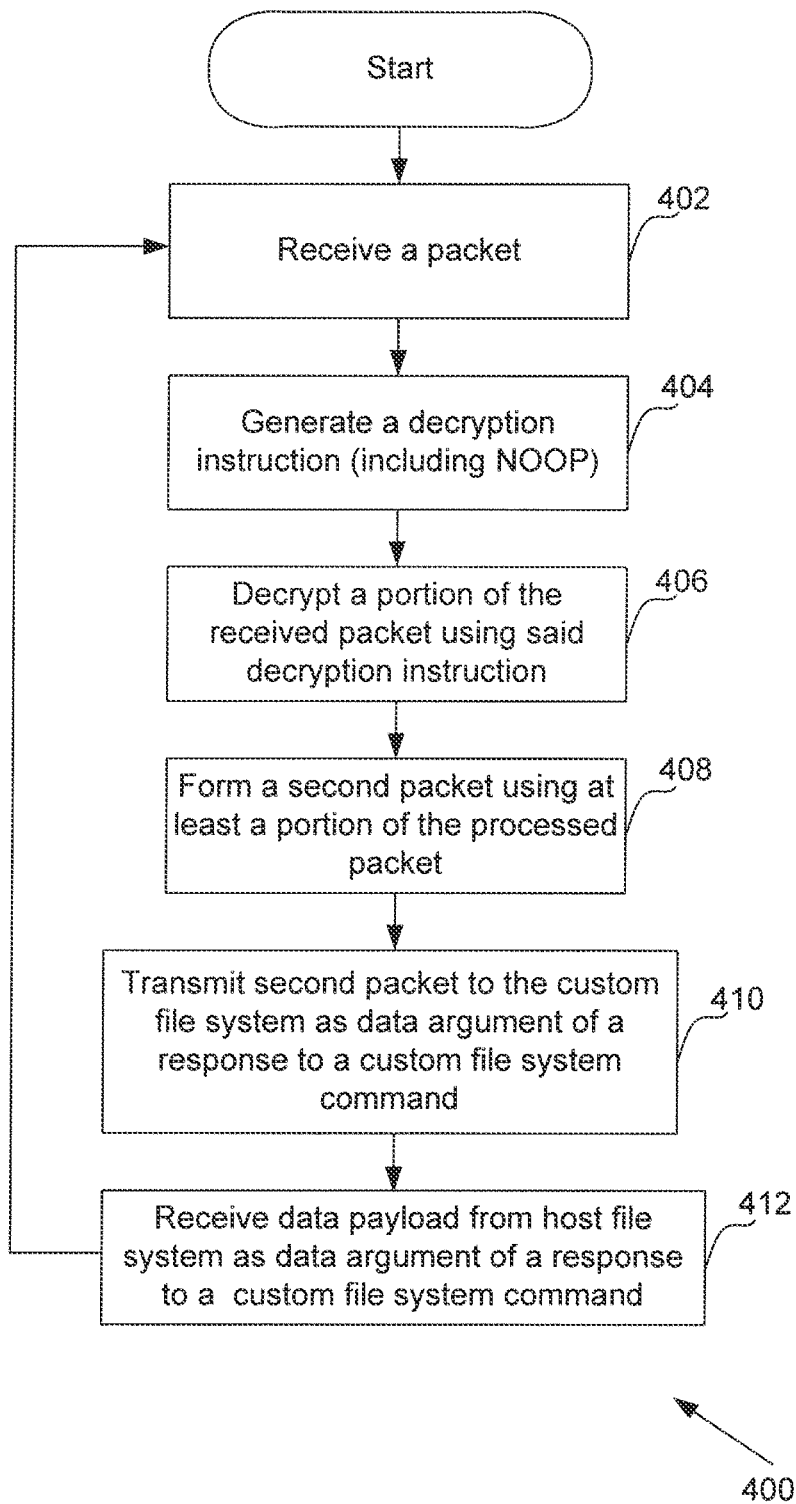
FIG. 4 shows exemplary steps for decrypting data using commands and data passed through a file system as separate parameters.

FIG. 4 shows exemplary steps 400 for decrypting data using commands and data passed through a file system as separate parameters. The exemplary steps may be utilized by a system 100 in FIG. 1, if the file system 104 utilizes the method of passing a decryption instruction as a separate parameter from the memory file manager 102 to the memory control interface 112. At step 402, a packet may be received from the non-volatile memory, such as a removable memory card, through the memory interface driver 116 of FIG. 1. The packet may be received in response to a file level decrypted read command transmitted from the memory file manager 102 to the file system 104, and received as a logical block address decrypted read command from the file system 104. At step 404, a decryption instruction is generated. Referring back to FIG. 1, the instruction may be based on a command received through the file system 104, or other configuration parameters passed to encryption/decryption engine 114. The decryption instruction may be to pass through the received packet (a no-operation (NOOP)), without decrypting it. Control passes to step 406, where at least a portion of the received packet is decrypted (or passed through) according to the decryption instruction. In step 408, at least a portion of the processed packet may be combined with other data such as status information or result flags to form a second packet. In step 410, the second packet is passed to the file system as the data argument of the response to a logical block address decrypted read command from the file system 104. The file system performs logical block address (LBA) to file-level conversion, where logical block address decrypted read results are associated with a result of a file-level decrypted read command. At step 412, the memory file manager receives the result of the file-level decrypted read command from the file system 104, and may extract the decrypted file data payload from the data argument of the returned result.

Figure 5:
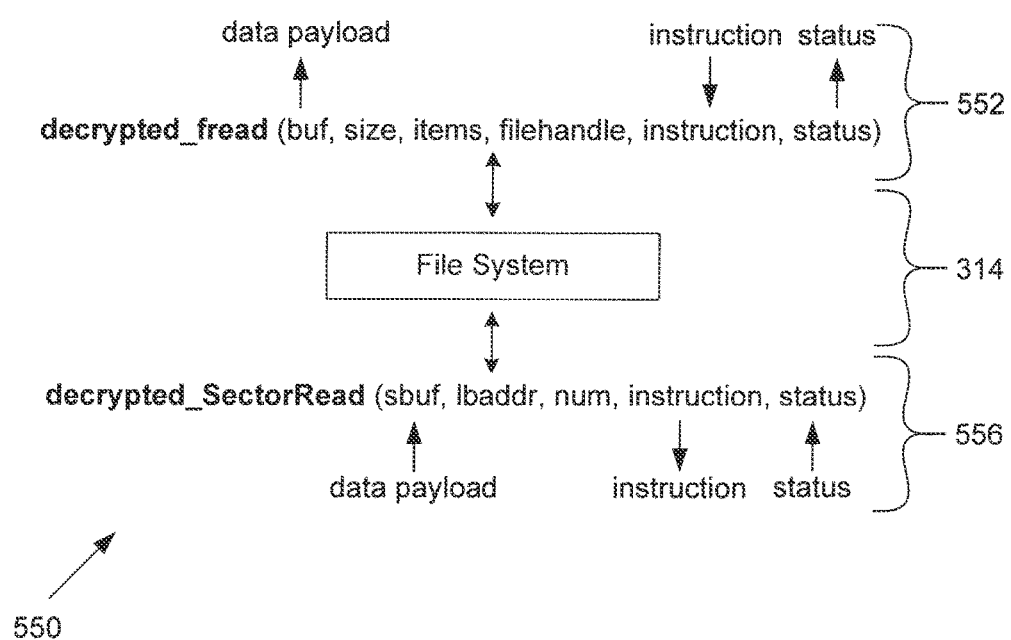
FIG. 5 is a diagram illustrating a system for passing data payload, data tags, decryption status, and decryption instructions through a file system as separate parameters.

FIG. 5 is a diagram illustrating a system for passing data payload, data tags, decryption status, and decryption instruction through a file system as separate parameters. A system 550 is a portion of a system for encrypting and decrypting data written to and read from a storage system, such as the system 100 of FIG. 1. Specifically, the file system 314 of the system 550 may be utilized as the file system 104 of system 100 in FIG. 1, where the file system 104 utilizes the method of passing encryption/decryption instructions and status as separate parameters from the memory file manager 102 to the memory control interface 112.

The system 550 utilizing a file system 314 may support a decrypted file read function 552 to read data from an encrypted file from a storage system, and decrypt the file data. The function prototype of the decrypted file read function 552 includes separate buf, status, and instruction parameters, to accommodate receiving a data payload and decryption status from, and passing an instruction to, the memory control software of a storage system device driver. The amount of data to read may be indicated by the product of the items parameter, which may indicate the number of items to transfer, and the size parameter, which may indicate the size of an item in bytes. The filehandle parameter indicates the file to which data is being read from. An application may call the decrypted file read function 552 of the file system 314 to read a file to a storage system and decrypt the file. The file system 314 will process the request, and may translate the file-level read request into a plurality of function calls to a decrypted sector read function 556 supported by the memory control software of a storage system device driver. The function prototype of the decrypted sector read function 556 includes separate instruction, sbuf, and status parameters, to accommodate passing the decryption instruction to the memory control software of a storage system device driver, and receiving at least a portion of the data payload and decryption status as a returned result. The num parameter may indicate the number of bytes to read, and the lbaddr parameter indicates the logical block address where the first byte may be read from. In system 550, in order to pass a decryption instruction and a decryption status through the file system, the API of the file system 314 accommodates the decryption instruction and decryption status as separate parameters of one or more functions.

FIGS. 2-5 illustrate a method for passing encryption/decryption instructions and status through a file system 104 between the memory file manager 102 and the memory device interface 110. By passing the instructions and status as separate parameters through a file system 104, a communication link is established that allows an encryption/decryption engine to be configured and monitored by a memory file manager 102. However, in order to change the control instructions or the status to be monitored, the API of the file system 104 and the underlying software or hardware combination utilized to implement the file system 104 may need to be modified. If the host utilizes a separate, additional file system in order to service storage requests or other storage systems that do not require encryption or decryption, additional hardware, memory, or firmware storage may be required, and coordination issues between the two file systems may need to be addressed. Further, not all file systems are capable of passing encryption/decryption instructions and status as separate parameters. It may be desirable to utilize file systems that are incapable of passing encryption/decryption instructions and status parameters, because of other capabilities these file systems may offer, such as multi-thread support.

According to one embodiment, a file system 104 incapable of passing encryption commands and decryption status as separate parameters, may still provide a communication link of encryption commands and decryption status between the memory file manager 102 and the memory device interface 110 in an architecture shown in the system 100. In this embodiment, data to be encrypted may be combined with encryption commands, and passed in the data parameters of the functions supported by the file system API. Additionally, data read from a storage system and decrypted may be combined with decryption status, and passed in the data parameters of the read functions supported by the file system API. Because the API of many file systems support the passing of data as parameters through the file system, this approach may be utilized with file systems incapable of passing encryption/decryption instructions and status as separate parameters, such as some host file systems. The combination of read or write data, sometimes referred to as data payloads, with commands or status information, may be referred to as packetization.

Figure 6:
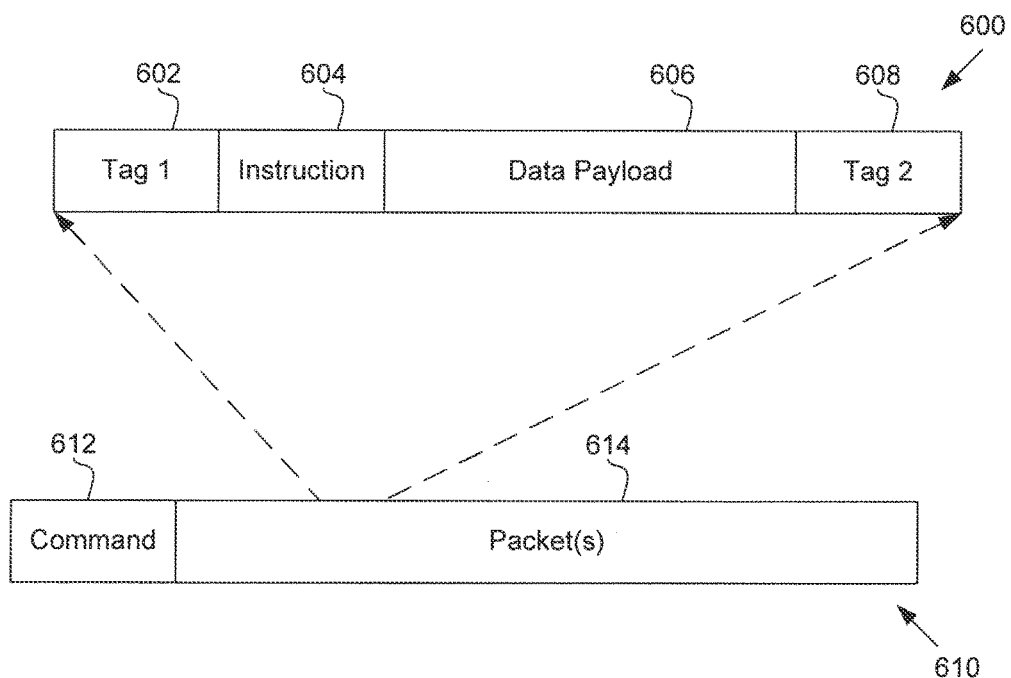
FIG. 6 is a diagram illustrating packetization of a data payload, data tags, and an instruction in accordance with an embodiment.

FIG. 6 is a diagram illustrating packetization of a data payload, data tags, and an instruction in accordance with an embodiment. A host file system command/data set 610 includes a command 612 and the data 614. The command/data set 610 may be suitable for passing through a host file system utilizing a function in the API of the host file system, such as a write file command which accepts a data argument. The data argument 614 includes a plurality of packets 600. Whereas a plurality of data payloads 606 might typically be passed as the data argument 614, here, a data payload 606, a plurality of instructions 604, and a plurality of data tags 602, 608 may be combined, in a processes sometimes referred to as packetization, to create a packet 600. The instruction may be an encryption instruction or a decryption instruction, or an instruction to otherwise set up, control, or receive status information from an encryption or decryption engine. The data payload 606 may be the data to encrypt, or may be other data associated with instruction 604. The packet 600 may be associated with a host file system command 612 as part of a command/data set 610, and the command/data set 610 may be passed to the host file system as command and data arguments of a supported function of the host file system. In this way, a host file system may treat packet 600 as if it contained at least a portion of the data associated with command 612. Stated another way, the instruction 604 may be passed through the host file system as part of the data argument 612 of a host file system command/data set 610.

A host file system may extract the command 612 from command/data set 610, and associate new commands with one or more packets 600 of the data 614. When the new command and associated packets 600 are received from the host file system, the receiver, such as the memory control interface 112 of the memory device interface 110 of FIG. 1, may be adapted to process packets 600 with an embedded instruction 604, or packets 600 without an embedded instruction 604. In other words, the host file system may still pass data 614 without embedded instructions, and therefore, a receiver may need to be able to determine if the received data is in the format of a packet 600 with embedded instructions 604. In one embodiment, data tags 602 and 608 may be used to identify or verify a packet 600 as containing an instruction 604 and a data payload 606. In one embodiment, a first data tag 602 within a packet 600 points to the location of a second data tag 608 within the packet 600, and the second data tag 608 points to the location of the first data tag 602. If the data tags 602, 608 do not point to the expected locations within the packet 600, then the packet 600 may not contain the instruction 604 and the data payload 606, and may be processed accordingly.

Other indicators within the packet 600 may be used to distinguish between received packets 600 that contain an instruction 604 and a data payload 606 from packets that contain only data. For example, instead of data tags 602, 608, a checksum or cyclic redundancy check (CRC) value could be computed using the instruction 604 and the data payload 606, and stored along with the instruction 604 and data payload 606 within the packet 600. The checksum or CRC value could be extracted from its expected location in the packet 600, and compared with the calculated checksum or CRC using instruction 604 and payload data 606 extracted from the packet 600. If the calculated CRC or checksum value matches the extracted CRC checksum value, then the packet 600 contains an instruction and payload data. If not, packet 600 may be processed as the data associated with a received command.

While FIG. 6 demonstrates how packetization may combine an instruction 604, with a data payload 606 and data tags 602, 608, in a packet 600, other combinations are possible. The data payload 606 typically associated with a command 612 may be combined with status, results, or other data to be passed through a host file system. For example, encryption or decryption status may be combined with a data payload to form a packet, and this packet could be passed through the parameters of a function supported by the API of a file system.

Figure 7:
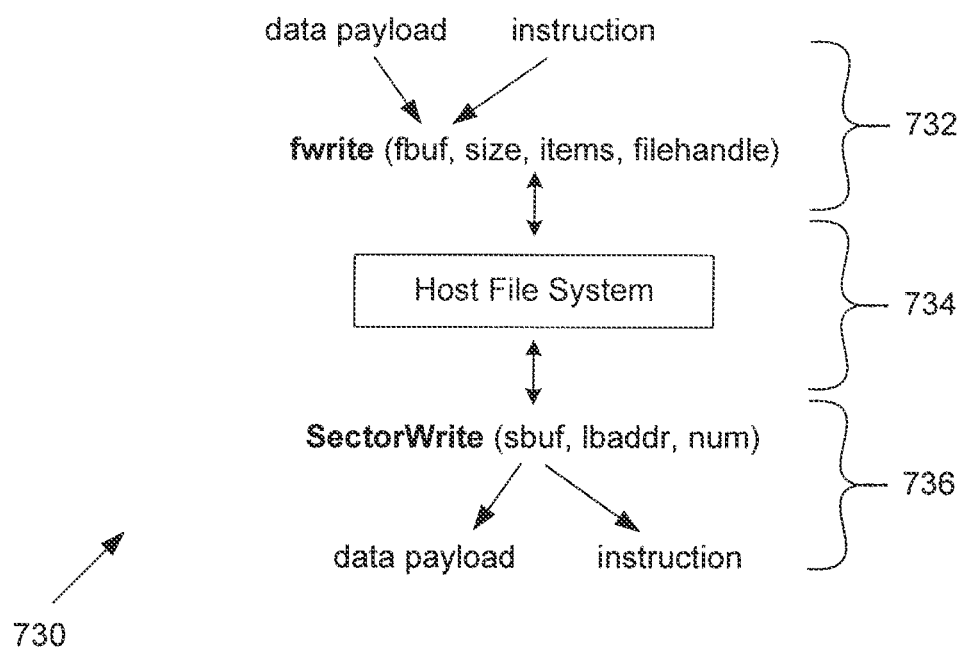
FIG. 7 is a diagram illustrating a system for passing a packetized data payload, data tags, and encryption instruction through a host file system in accordance with an embodiment.

FIG. 7 is a diagram illustrating a system for passing a packetized data payload, data tags, and encryption instruction through a host file system in accordance with an embodiment. A system 730 is a portion of a system for encrypting and decrypting data written to and read from a storage system, such as the system 100 of FIG. 1. Specifically, the file system 734 of the system 730 may be utilized as the file system 104 of system 100 in FIG. 1, where the file system 104 utilizes the embodiment of packetizing the encryption/decryption instructions and status with the data payloads, and passing the packets as the data parameters of the file system API functions, between the memory file manager 102 to the memory control interface 112.

The system 730 utilizing a host file system 734 may support passing encryption instructions from an application to the memory control software of a storage system device driver. The host file system 734 may also be referred to as the host file system process. The host file system 734 may support a file write function 732 that includes an fbuf parameter in the function prototype. Typically, the fbuf parameter accepts the file data to write, or a pointer to the file data to write. A process calling the file write function 732 may packetize the data payload, encryption instruction, and data tags as shown in the packet 600 of FIG. 6, and may pass a plurality of packets 614 or a pointer to the plurality of packets 614 as the fbuf argument in a function call to the file write function 732. The total amount of data payload bytes passed in the fbuf argument may be indicated by the product of the items parameter, which may indicate the number of items to transfer, and the size parameter, which may indicate the size of an item in bytes. The filehandle parameter indicates the file to which data is being written to.

The host file system 734 will process the request, and may translate the file-level write request into a plurality of function calls to a sector write function 736 supported by the memory control software of a storage system device driver. The function prototype of the sector write function 736 includes an sbuf parameter, to accommodate passing the data to write to a storage system. The num parameter may indicate the number of bytes to write, and the lbaddr parameter indicates the logical block address where the first byte may be written to. Typically, the sbuf parameter accepts the sector data to write, or a pointer to the sector data to write. The sector write function 736 of the memory control software of a storage system device driver may be adapted to extract the instruction and data payload from the sbuf argument passed as part of the function call to the sector write function 736. Therefore, the system 730 may not require a file system with an API capable of accepting the encryption instruction as a parameter of one or more functions.

Returning to FIG. 1, the host file system 734 may be utilized as the file system 104 in the system 100, because the host file system 734 may pass encryption instructions suitable to allow memory file manager 102 to configure the encryption/decryption engine 114. When host file system 734 is utilized in the system 100, the memory file manager 102 may be adapted to packetize data payloads and encryption instructions into packets, and pass packets as data arguments to the write functions 732 supported by the API of the host file system 734. Additionally, the memory control interface 112 may be adapted to extract data payloads and encryption instructions from the data arguments of received function calls from the host file system 734. In another embodiment, the system 730 may also pass data tags through the host file system 734, which may allow the sbuf argument of a call to the sector write function 736 to be identified as containing part or all of an encryption instruction and data payload.

Returning to the Win32 API example, utilizing the packetization of data payload, data tags, and encryption instruction, the IpBuffer parameter of the WriteFile function may be used to pass encryption instructions and data payloads through a Windows host file system. Therefore, a host file system such as the Win32 file system may be utilized as the file system 104 in the system 100 that supports file encrypt and write operations. Further, any host file system capable of passing a data structure between a function in its API, and the memory control software of a storage system device driver, may be utilized as the file system 104 in accordance with an embodiment.

Figure 8:
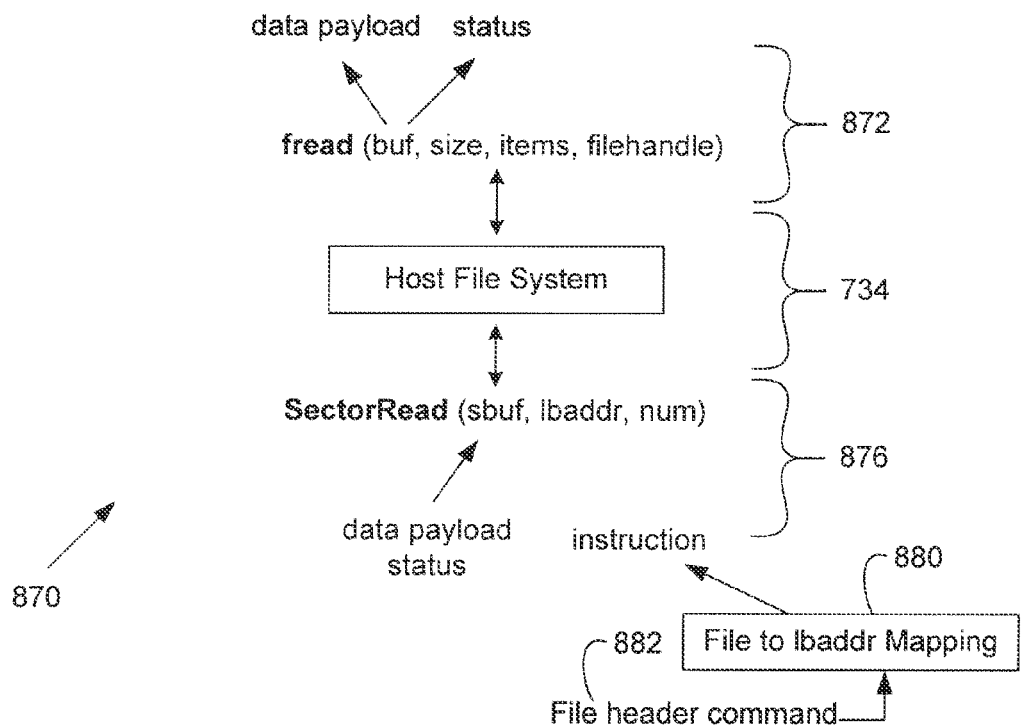
FIG. 8 is a diagram illustrating a system for passing a packetized data payload, data tags, and decryption status through a host file system, and determining a decryption instruction, in accordance with an embodiment.

FIG. 8 is a diagram illustrating a system for passing a packetized data payload, data tags, and decryption status through a host file system, and determining a decryption instruction, in accordance with an embodiment. A system 870 is a portion of a system for encrypting and decrypting data written to and read from a storage system, such as the system 100 of FIG. 1. Specifically, the file system 734 of the system 870 may be utilized as the file system 104 of system 100 in FIG. 1, where the file system 104 utilizes one embodiment of packetizing the encryption/decryption instructions and status with the data payloads, and passing the packets as the data parameters of the file system API functions, between the memory file manager 102 to the memory control interface 112.

The system 870 utilizing a host file system 734 may support passing decryption status to an application from the memory control software of a storage system device driver. As explained further below, the system 870 may not have to support passing the decryption instruction through a host file system 734. The host file system may support a file read function 872 that includes a buf parameter in the function prototype. Typically, the buf parameter may be a storage array or a pointer to a storage array for the file read result.

The file read function 872 may be called in order to read file data from a storage system. The file data may be encrypted. The total amount of data bytes to read may be indicated by the product of the items parameter, which may indicate the number of items to transfer, and the size parameter, which may indicate the size of an item in bytes. The filehandle parameter indicates the file to which data is being read from. The host file system 734 will process the request, and may translate the file-level read request into a function call to a sector read function 876 supported by the memory control software of a storage system device driver. The data payload to be returned in response to the call of the sector read function 876 contains at least a portion of the file data read from the storage system and decrypted as necessary. The function prototype of the sector read function 876 includes an sbuf parameter, to accommodate returning the data read from a storage system. The num parameter may indicate the number of bytes to read, and the lbaddr parameter indicates the logical block address where the first byte may be read from. The sbuf parameter may be a pointer to the storage pointed to by the buf parameter of file read instruction 872. The data payload may be packetized with other data tags, result, or status information, and returned in the storage pointed to by the sbuf parameter. The host file system 734 will return this data in the array pointed to by the buf parameter of the file read function 872, where the data payload, data tags, and result or status information may be extracted.

The decryption instruction may be determined by the memory control software of a storage system device driver without passing the instruction through the host file system 734. In one embodiment, the file header or a portion of the encrypted file read from the storage system may be unencrypted, and may contain a command or a partial command describing how to decrypt the remainder or other portions of the file, which may be encrypted. The command 882 may include a variety of keys, key indexes, or other configuration parameters suitable for at least partially configuring a decryption engine, such as encryption/decryption engine 114 of FIG. 1. The command 882 may also be based on one or more global configuration registers located within the memory device interface 110 of FIG. 1. Because the sector read function 876 operates on sectors, and may not have knowledge of which sectors are associated with a file to be decrypted, a file to logical block address translation engine 880 may determine the particular logical block address ranges associated with a file to be decrypted. In one embodiment, the file to logical block address translation engine 880 uses a file allocation table (FAT), and may be located within the memory file manager 102 of FIG. 1, with a direct communication interface with the memory control interface 112 of FIG. 1 that bypasses the host file system 734, which may be utilized as the file system 104 in FIG. 1. The command 882 and the output of the file to logical block address translation engine 880 may be used to generate a decryption instruction for data read from memory in response to a call to a sector read function 876. Therefore, the file system 734 of system 870 may not require an API capable of accepting the decryption instruction or result/status information as separate parameters of one or more functions.

Returning to FIG. 1, the host file system 734 may be utilized as the file system 104 in the system 100, because the host file system 734 may pass results/status information suitable to allow memory file manager 102 to monitor the encryption/decryption engine 114, and because the decryption instructions may be determined by the memory device interface 110 without passing the decryption instructions through the host file system 734. When the host file system 734 is utilized in the system 100, the memory file manager 102 may be adapted to extract data payloads, decryption data tags, and results or status from the packets returned in response to calls to a host file system read file function call 872. Further, the memory file manager 102 may be adapted to provide a file to logical block address translation engine 880 to allow the memory control interface 112 to determine the sectors or logical block addresses associated with a file to be decrypted. Additionally, the memory control interface 112 may be adapted to packetize data payloads, decryption data tags, and results or status and return the packetized data to the host file system 734 as return values of a sector level read command 876.

The memory control interface 112 is also adapted to receive a decryption command associated with a file. For example, the memory control interface may receive a file decryption command by reading an unencrypted file header from a file that is otherwise encrypted. The memory control interface 112 may be further adapted to send a request directly to memory file manager 102 to retrieve a set of logical block address ranges corresponding to the file to be decrypted. The set of logical block address ranges, combined with the file decryption command, may be utilized to operate the encryption/decryption engine 114 in order to decrypt portions of a file read out from a storage system in response to a call to a sector read function 876.

Returning to the Win32 API example, utilizing the packetization of data payload, data tags and status, and the generation of a decryption instruction that may not require passing the decryption instruction through a host file system, the IpBuffer parameter of the ReadFile function may be used to data payloads and status through a Win32 host file system. Therefore, a host file system such as the Win32 file system may be utilized as the file system 104 in the system 100 that supports file read and decrypt operations. Further, any host file system capable of passing a data structure between a function in its API, and the memory control software of a storage system device driver, may be utilized as the file system 104 in accordance with an embodiment.

In the exemplary systems 730 and 870 in FIGS. 7 and 8, the parameters to control encryption operations and report the status of a decryption operation are passed within the data arguments of write/read commands supported by the API of the host file system 734. The host file system 734 treats the encryption/decryption parameters identically to any other file data passed through the host file system 734. Therefore, the encryption/decryption parameters and status do not modify the operation of the host file system 734. Conversely, the host file system 734 utilized as the file system 104 of FIG. 1 does not control or modify the operation of the encryption/decryption engine 114, and the encryption and decryption of data in the memory device interface 110 of FIG. 1 is independent of any processing that the file system 104 performs in handling read and write commands. By passing the encryption instructions and decryption status through the file system 104 as data arguments, the quantity or type of encryption and decryption parameters to control memory device interface 110 may be modified without changing the API of the host file system 104.

While the examples in FIGS. 7 and 8 show the use of file write and read functions, other host file system API functions capable of passing data structures through the file system in accordance with the foregoing description may be used as well. These include, for example, data structures that are not files or portions of files. Further, while the exemplary systems 730 and 870 demonstrate an instruction and status results being passed through the host file system, any variety of keys, key indexes, or other configuration parameters, or status and result information, may be passed within the data arguments of commands supported by the host file system.

While the examples in FIGS. 7 and 8 show the use of file write and read functions to encrypt and write to memory, and decrypt and read from memory, the write and read functions may still be used for operations that do not require encryption or decryption. For example, the file write function may also still be utilized to write an unencrypted file from a storage system. Similarly, a file read function may also be used to read an unencrypted file from a storage system. As explained above in the description of FIG. 6, data structures such as data tags may be used to identify the data that contains packetized instructions, status, and data payload.

Figure 9:
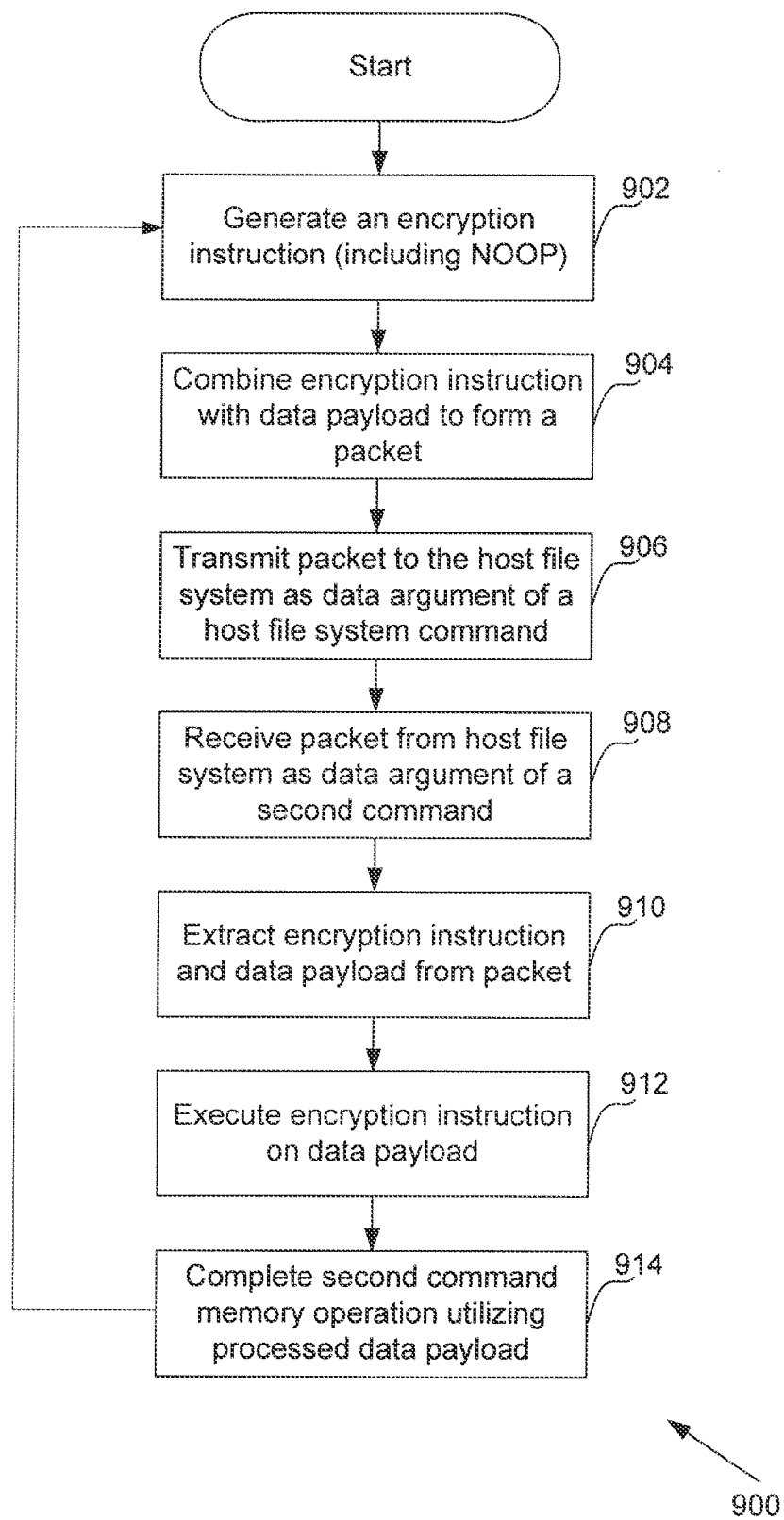
FIG. 9 shows exemplary steps for encrypting data using commands and data passed through a host file system, in accordance with an embodiment.

FIG. 9 shows exemplary steps 900 for encrypting data using commands and data passed through a host file system, in accordance with an embodiment. The exemplary steps may be utilized by a system 100 in FIG. 1, if the file system 104 utilizes the disclosed embodiment of passing a packetized encryption instruction and data payload through the data parameter of a host file system function, from the memory file manager 102 to the memory control interface 112. At step 902, an encryption instruction is generated. Referring briefly back to FIG. 1, the memory file manager 102 may receive a request from an application to encrypt and write a file to non-volatile memory. The request may include other parameters, such as digital rights management (DRM) information specified by the application, which may, for example, define the encryption key and encryption algorithm that the encryption/decryption engine 114 will use. In another example, the memory file manager may also receive a request from an application to write a file to non-volatile memory without any encryption, in which case the encryption instruction formed will be a no-operation (NOOP), and the encryption/decryption engine 114 will simply pass through the data from the memory control interface 112 to the memory interface driver 116.

Returning back to FIG. 9, at step 904, the memory file manager may combine the encryption instruction with the data payload to be encrypted to form a packet. The data payload to be encrypted may be a portion or all of a data file to be written. The packet may optionally include data tags, checksums, CRC values, or other flags to identify it as comprising an encryption instruction and payload. At step 906, the packet is associated with a command supported by the host file system, such as a "write file" command, and transmitted to the host file system as at least a portion of the data argument of a command supported by the host file system. The host file system may receive a command and associated packet in step 906, and may perform file-level to logical block address (LBA) conversion, where a file is assigned to a plurality of available logical block addresses. In response to receiving the exemplary "write file" command, the host file system may also generate a logical block address write instruction, where a logical block address write instruction is associated with a packet. In another embodiment, the host file system may divide the packet into two or more fragments, and associate each fragment with a logical block address write instruction.

Control passes to step 908, where a logical block address write instruction and packet is received. In another embodiment, two or more logical block write instruction and packet fragment pairs are received, where each packet fragment is a portion of a packet. In this embodiment, the received packet fragments are cached until a complete packet can be reassembled from the packet fragments. The complete packet corresponds to the original packet received by the host file system and fragmented by the host file system. In step 910, the encryption instruction and data payload are extracted from the packet. If data tags, checksums, CRC values, or other flags were used to identify the packet as containing a data payload or instruction, then step 910 may extract these fields from the packet and evaluate the contents to determine or verify whether the received packet contains an encryption instruction and data payload, or is just a standard logical block write instruction without an encryption instruction embedded in the associated data argument.

Depending on the embodiment, all or a portion of the packet may be encrypted according to the encryption instruction. Similarly, only the encrypted results may be stored in a non-volatile memory, or the encrypted results may be stored with other information in the non-volatile memory.

In a first embodiment, only the data payload is encrypted and stored. Control passes to step 912, where the data payload is encrypted (or passed through) according to the extracted encryption instruction to form a processed data payload. Control then passes to step 914, where the processed data payload is written to the non-volatile memory, such as a removable memory card, according to the received logical block address write instruction.

In a second embodiment, only the data payload is encrypted, and the encrypted data payload is combined with some or all of the remaining unencrypted portions of the received packet and stored in the non-volatile memory. Control passes to step 912, where the data payload is encrypted (or passed through) according to the extracted encryption instruction to form a processed data payload. Control then passes to step 914, where the processed data payload is combined with some or all of the remaining packet contents such as the encryption instruction and data tags, checksums, flags, or CRC values. The combination is then written to the non-volatile memory according to the received logical block address write instruction.

In a third embodiment, the entire received packet, including the data payload, is encrypted and stored. Control passes to step 912, where the entire packet may be encrypted, including the data payload within the packet. Control then passes to step 914, where the encrypted packet, containing the encrypted data payload, is stored in the non-volatile memory according to the received logical block address write instruction.

Writing the entire packet to memory instead of just the encrypted data payload may allow the host file system's calculation of the amount of data written to memory to be consistent with the amount of data actually written to memory. Where the size of the data payload is significantly larger than the size of the encryption instruction and remaining packet contents, the storage overhead associated with storing the entire packet contents may be relatively insignificant. For purposes of illustrating the relative storage overhead associated with storing the entire packet contents, assume that a data payload is 64 kilobytes, and the data tags and encryption instruction is 16 bytes. The extra storage space to store the data tags and encryption instruction is minimal, relative to the storage space needed to store the data payload.

Figure 10:
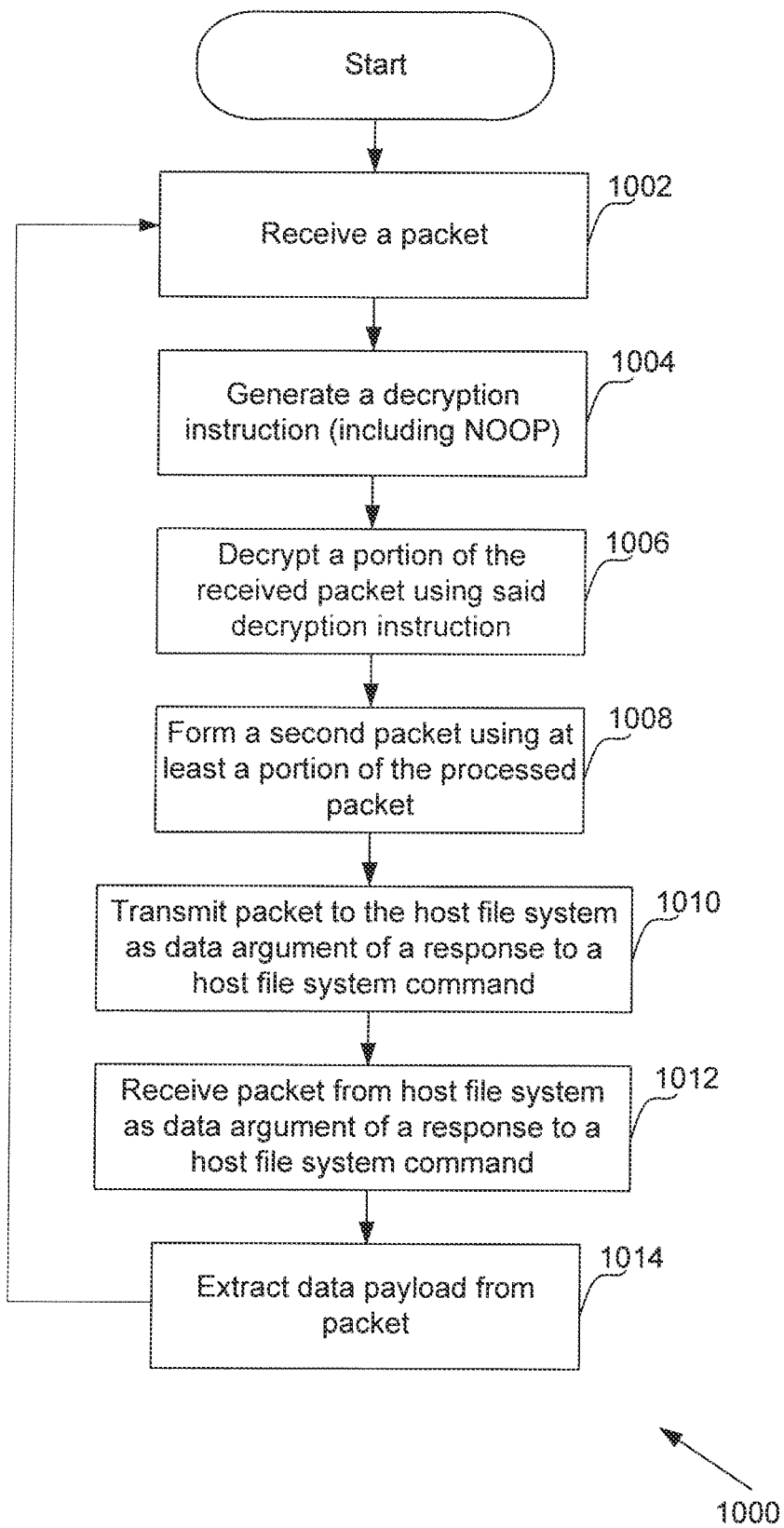
FIG. 10 shows exemplary steps for decrypting data and passing status through a host file system, in accordance with an embodiment.

FIG. 10 shows exemplary steps 1000 for decrypting data and passing status through a host file system, in accordance with an embodiment. The exemplary steps may be utilized by a system 100 in FIG. 1, if the file system 104 utilizes the disclosed embodiment of passing a packetized data payload through the data parameter of a host file system function, from the memory control interface 112 to the memory file manager 102. At step 1002, a packet may be received from a non-volatile memory, such as a removable memory card, through the memory interface driver 116 of FIG. 1. Referring briefly back to FIG. 1, the packet may be received in response to a logical block address read command issued by the file system 104 to the memory device interface 110. The logical block address read command may be issued in response to a file level read command transmitted from the memory file manager 102 to the host file system 104. The memory file manager 102 generated the file level read command in response to a read request from an application process.

At step 1004, a decryption instruction is generated. Referring back to FIG. 8, the decryption instruction may be based on other configuration parameters passed to encryption/decryption engine 114, such as decryption instructions associated with a range of logical block addresses associated with a non-volatile memory device. The instruction may be based on unencrypted header information read from a file to be decrypted, and may be based on a determination that the logical block addresses being read out are associated with a file to be decrypted. In this embodiment, a decryption instruction is selected based on the logical block address associated with the received packet. In another embodiment, the packet contains additional unencrypted information used to form a decryption instruction, such as an index to a decryption key, or the information used to encrypt the data payload, such as the encryption instruction, if stored along with the data payload as described in an embodiment of step 914 of FIG. 9. The decryption instruction may also be based on one or more global configuration registers located within the memory device interface 110 of FIG. 1. The decryption instruction may be to pass through the received packet without decrypting it, also referred to as a no-operation or NOOP. Control passes to step 1006, where at least a portion of the received packet is decrypted (or passed through) according to the decryption instruction. In one embodiment, the data payload portion of the packet is decrypted. In another embodiment, the entire packet is decrypted.

In step 1008, at least a portion of the processed packet may be combined with other data such as status information or result flags to form a second packet. In step 1010, the second packet is passed to the host file system as the data argument of the response to a logical block address read command issued by the file system 104 of FIG. 1. The file system performs logical block address (LBA) to file-level conversion, where logical block address read results are associated with a file-level read command result. At step 1012, the memory file manager receives the result of the file-level read command from the file system 104 of FIG. 1. Control passes to step 1014, where the memory file manager 102 of FIG. 1 may extract the decrypted file data payload from the data argument of the returned result of the host file system read command, and may return the extracted decrypted data payload to an application process that requested the file-level read of encrypted data from the non-volatile memory. The memory file manager 102 may also extract status information or result flags from the received data as necessary to monitor the encryption/decryption engine 114 of FIG. 1.

The system and method described herein may be implemented within a variety of secure storage architectures. For example, a host file system may be utilized when performing encrypted/decrypted write and read operations to a TrustedFlash™ memory device from SanDisk Corporation of Milpitas, Calif., in accordance with TrustedFlash™ protocols. TrustedFlash™ refers in part to the creation, organization, and management of secure storage within a memory device. Another aspect of implementing a secure system in accordance with TrustedFlash™ protocols, where a system comprises a host and a memory device with the TrustedFlash™ architecture, is the transmission of data between the host and the memory device. In accordance with TrustedFlash™ protocols, some data transmitted between the host and the memory device must be encrypted, to prevent the data from being intercepted and read by an unauthorized party. The encrypted data may include digital content to be securely stored to or read from the TrustedFlash™ memory device, such as MP3 format audio files, picture files, and video files. When such data is being stored within a secure partition of a TrustedFlash™ memory device, or stored in a protected format within a public partition, the host may encrypt the data before transmission to the device, and the memory device may decrypt the data and perform other operations before storage. When reading such data stored in a secure partition of the TrustedFlash™ memory device, or stored in a protected format in a public partition of the TrustedFlash™ memory device, the memory device may encrypt the data before transmission to the host, and the host may decrypt the received data. The encryption and decryption key utilized to perform the encryption and decryption operations may be referred to as a session key, and may be generated and utilized by both the host and non-volatile memory device for one or more read and write accesses.

Some writes to a TrustedFlash™ memory device do not require encryption before transmission from the host to the memory device, and some of the data received from the memory device during a read operation is not encrypted. Examples of unencrypted data include File Allocation Table (FAT) data, directories, and data stored in an unprotected format within the non-secure areas of the memory device, such as the public storage partition of a TrustedFlash™ memory device. In contrast, other accesses to secure partitions of a TrustedFlash™ memory device, and accesses to write and read data in a protected format, may require encryption of data being written to the memory device, and decryption of the data read from the memory device. Returning to FIG. 1, a host file system may be utilized as file system 104. A memory file manager 102 may receive application requests to write to or read from the non-secure areas or the secure areas of a TrustedFlash™ memory. By implementing a method and system as suggested above, the memory file manager may form encryption instructions and data tags that may be transmitted through the file system 104 along with the data payload to be encrypted and stored, so that the memory device interface 110 may encrypt and write data to the TrustedFlash™ memory. Similarly, the memory file manager 102 may also receive requests to read secure areas of a TrustedFlash™ memory device, and receive status of the decryption occurring in memory device interface 110 through decryption parameters passed through the file system 104. The memory file manager 102 may also recover the data payload, data tags, and decryption status from the decrypted results returned from the memory device interface 110 through the file system 104. The memory file manager 102 may also provide a file to logical block address translation engine and direct interface to memory device interface 110, so that memory control interface 112 may associate file decryption commands with logical block addresses of sectors read out from a storage system.

The API of many host file systems supports passing of data, such as file data, as parameters through the host file system. Therefore, various suggested systems and methods capable of performing encrypted write and decrypted read operations with a storage system facilitate the use of a host file system. There are several advantages associated with utilizing a host file system within a system capable of performing encrypted/decrypted write and read operations to a non-volatile memory such as a removable memory card. A host file system may be optimized for the resource limitations or features of the host, and may include enhanced features such as multi-thread support, where multiple applications may access the file system in parallel through resource sharing and scheduling algorithms.

There is overhead such as executable code and memory space associated with implementing a file system. Thus, because the a system and method implemented as suggested above may eliminate the need for a specialized, additional file system in order to perform encrypted/decrypted write and read operations to a storage system, this overhead expense may be avoided. Finally, implementing a host file system and specialized file system in parallel may cause coordination issues, such as cached contents of one file system not being reflected in the other file system, and synchronization of the contents of both file systems. Thus, using a single host file system may eliminate the issues associated with utilizing two file systems in parallel.

Although the invention has been described with respect to various system and method embodiments, it will be understood that the invention is entitled to protection within the full scope of the appended claims.

The invention claimed is:

1. A method of encrypting data for storage in a storage device, the method comprising:
    embedding an encryption instruction with file data in a data set at a host device;
    passing the data set comprising the file data and the embedded encryption instruction to a host file system process at the host device through a parameter of a file system function of an application programming interface that lacks encryption capability, wherein the parameter of the file system function is for passing contents of a file to the host file system process, and wherein the host file system process performs file-level to logical block address conversion; and
    generating a command set using the host file system process, wherein the command set comprises a logical block address command and the data set that includes the file data and the embedded encryption instruction, wherein the command set is transmitted from the host device to the storage device for extraction of the embedded encryption instruction and encryption of the file data at the storage device.

2. The method of claim 1 further comprising associating the logical block address command with at least the data set to form the command set.

3. The method of claim 1, wherein the file system function of the application programming interface is a host file system write instruction.

4. The method of claim 1, wherein the logical block address command is a logical block address write instruction.

5. The method of claim 1, wherein the encryption instruction is an instruction not to encrypt.

6. A method of decrypting data stored in a storage device, the method comprising:
    generating a logical block address read command and an associated data payload at a host device, the data payload including an embedded decryption instruction, wherein the logical block address read command is generated in response to a calling of a file system function of an application programming interface that lacks encryption capability, wherein the application programming interface is for a host file system process that performs file-level to logical block address conversion;
    reading encrypted file data from the storage device in response to the logical block address read command and the associated data payload that includes the embedded decryption instruction;
    forming decrypted file data by decrypting the encrypted file data using at least the embedded decryption instruction;
    passing the decrypted file data to the host file system process; and
    receiving the decrypted file data from the host file system process in response to the calling of the file system function of the application programming interface that lacks encryption capability.

7. The method of claim 6, wherein reading the encrypted file data from the storage device comprises reading the encrypted file data from a memory card.

8. The method of claim 6 further comprising determining the embedded decryption instruction based on a comparison of an address of the logical block address read command with an address range.

9. The method of claim 6 further comprising determining the embedded decryption instruction based on a data field extracted from a packet received from the storage device, the packet comprising the encrypted file data.

10. The method of claim 6, wherein the decryption instruction is an instruction not to decrypt.

11. The method of claim 6 further comprising passing a plurality of status bits to the host file system process in a packet that includes the decrypted file data.

12. The method of claim 11 further comprising extracting the plurality of status bits from the packet.

13. The method of claim 6, wherein the decrypted file data is passed to the host file system process in response to a logical block address read command.

14. The method of claim 6, wherein the file system function of the application programming interface is a host file system read command.

15. A method of transferring data and encryption instructions through a host file system for storing encrypted data in a storage device, the method comprising:
    receiving a write command and a payload of file data from a host program;
    determining a data verification field using at least the payload of file data;
    embedding an encryption instruction in the payload of file data and combining the payload of file data and the embedded encryption instruction with the data verification field to form a data set;
generating a file system level write command based on the write command;
associating the data set and the file system level write command to form a file system level write command set;
passing the file system level write command set to a host file system process, wherein the payload of file data that includes the embedded encryption instruction is passed through a parameter of a file system function of an application programming interface of the host file system process, wherein the application programming interface lacks encryption capability, wherein the parameter is for passing contents of a file to the host file system process, and wherein the host file system process performs file-level to address-level conversion;
receiving an address-level write command set from the host file system process, wherein the address-level write command set is derived from the file system level write command set and comprises the data set associated with an address level command;
extracting the data set from the address-level write command set;
extracting the embedded encryption instruction, the data verification field, and the payload of file data from the data set;
verifying the payload of file data using at least the data verification field;
encrypting at least the payload of file data based on the embedded encryption instruction, wherein the encrypting of at least the payload of file data is independent of the host file system process;
generating a device level write command based on the address level command; and
associating at least the encrypted payload of file data with a device level write command to form a device level write command set that writes the encrypted payload of file data to the storage device.

16. A non-transitory computer readable medium having stored thereon computer-executable instructions for performing the following steps:
embedding an encryption instruction with file data in a data set;
passing the data set comprising the file data and the embedded encryption instruction to a host file system process at a host device through a parameter of a file system function of an application programming interface that lacks encryption capability, wherein the parameter of the file system function is for passing contents of a file to the host file system process, and wherein the host file system process performs file-level to logical block address conversion;
generating a command set using the host file system process, wherein the command set comprises a logical block address command and the data set that includes the file data and the embedded encryption instruction; and
transmitting the command set from the host device to a storage device for extraction of the embedded encryption instruction and encryption of the file data at the storage device.

17. A non-transitory computer readable medium having stored thereon computer-executable instructions for performing the following steps:
sending a read command and an associated data payload to a host file system process by calling a file system function of an application programming interface of the host file system process from an application program, wherein the file system function of the application programming interface lacks encryption capability, wherein the data payload includes an embedded decryption instruction, and wherein the host file system process performs file-level to logical block address conversion;
receiving a first data set from a storage device based on the read command and the data payload;
decrypting at least a portion of the first data set using at least the embedded decryption instruction to form a decrypted data set;
forming a second data set comprising the decrypted data set;
passing the second data set to the host file system process; and
receiving a third data set from the host file system process in response to the calling the file system function of the application programming interface that lacks encryption capability, wherein the third data set comprises the decrypted data set.

18. A non-transitory computer readable medium having stored thereon computer-executable instructions for performing the following steps:
receiving a write command and a payload of file data from a host program;
determining a data verification field using at least the payload of file data;
embedding an encryption instruction in the payload of file data and combining the payload of file data and the embedded encryption instruction with the data verification field to form a data set;
generating a file system level write command based on the write command;
associating the data set and the file system level write command to form a file system level write command set;
passing the file system level write command set to a host file system process, wherein the payload of file data that includes the embedded encryption instruction is passed through a parameter of a file system function of an application programming interface of the host file system process, wherein the application programming interface lacks encryption capability, wherein the parameter is for passing contents of a file to the host file system process, and wherein the host file system process performs file-level to address-level conversion;
receiving an address-level write command set from the host file system process, wherein the address-level write command set is derived from the file system level write command set and comprises the data set associated with an address level command;
extracting the data set from the address-level write command set;
extracting the embedded encryption instruction, the data verification field, and the payload of file data from the data set;
verifying the payload of file data using at least the data verification field;
encrypting at least the payload of file data based on the embedded encryption instruction;
generating a device level write command based on the address level command; and
associating at least the encrypted payload of file data with the device level write command to form a device level write command set that writes the encrypted payload of file data to a storage device.

19. The non-transitory computer readable medium of claim 18, wherein the device level write command set is communicated to a memory card.

20. The non-transitory computer readable medium of claim 18, wherein the data verification field comprises a start address pointer and an end address pointer, wherein the start address pointer comprises a beginning address of the payload of data, and the end address pointer comprises an end address of the payload of data.

21. The non-transitory computer readable medium of claim 18, wherein the data verification field further comprises a first data field containing a signature, and a second data field containing an address of the first data field.

22. The non-transitory computer readable medium of claim 21, wherein the signature comprises an address of the second data field.

23. The non-transitory computer readable medium of claim 18, wherein the data verification field further comprises a checksum calculated using at least the payload of file data.

\* \* \* \* \*